US010733210B2

(12) United States Patent
Jangid et al.

(10) Patent No.: US 10,733,210 B2
(45) Date of Patent: Aug. 4, 2020

(54) REDUCING ELECTRONIC RESOURCE CONSUMPTION USING SEARCH DATA

(71) Applicant: Microsoft Technology Licensing, LLC, Redmond, WA (US)

(72) Inventors: Charu Jangid, San Francisco, CA (US); Wei Wang, San Jose, CA (US); Aayush Gopal Dawra, Sunnyvale, CA (US); Mahesh Vishwanath, Cupertino, CA (US); Qiang Wu, Sunnyvale, CA (US); Kirill Talanine, Sunnyvale, CA (US); Robert Gibson, Sunnyvale, CA (US); Monica Cai, Palo Alto, CA (US); Warren Bartolome, San Jose, CA (US); James Michael Fell, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 15/826,644

(22) Filed: Nov. 29, 2017

(65) Prior Publication Data

US 2019/0163808 A1     May 30, 2019

(51) Int. Cl.
| | |
|---|---|
| *G06F 16/00* | (2019.01) |
| *G06F 16/28* | (2019.01) |
| *G06F 16/248* | (2019.01) |
| *G06F 16/2457* | (2019.01) |
| *G06F 16/958* | (2019.01) |

(52) U.S. Cl.
CPC ......... *G06F 16/285* (2019.01); *G06F 16/248* (2019.01); *G06F 16/24573* (2019.01); *G06F 16/958* (2019.01)

(58) Field of Classification Search
CPC ..................................................... G06F 16/00
See application file for complete search history.

(56) References Cited

U.S. PATENT DOCUMENTS

| | | | | |
|---|---|---|---|---|
| 2007/0271232 | A1* | 11/2007 | Mattox | G06Q 10/10 |
| 2014/0136933 | A1* | 5/2014 | Berger | G06Q 50/01 |
| | | | | 715/202 |
| 2014/0137004 | A1* | 5/2014 | Berger | G06F 3/0482 |
| | | | | 715/760 |
| 2016/0092998 | A1* | 3/2016 | Goel | G06Q 50/01 |
| | | | | 705/319 |
| 2016/0275080 | A1* | 9/2016 | Xia | G06Q 50/01 |

* cited by examiner

*Primary Examiner* — Khanh B Pham
(74) *Attorney, Agent, or Firm* — Schwegman Lundberg & Woessner, P.A.

(57) ABSTRACT

Techniques for reducing electronic resource consumption using search data are disclosed herein. In some embodiments, a computer-implemented method comprises: identifying a cohort of profiles from profiles based on a determination that at least one attribute is shared among the profile data of the cohort; receiving corresponding search appearance data including an impression count for the cohort of profiles; selecting reference profiles from the cohort based on the impression counts of the reference profiles; selecting a target profile from the cohort based on the impression count of the target profile; identifying a trend corresponding to at least one feature among the reference profiles; and causing an indication of the feature(s) to be displayed on a computing device of the user of the target profile based on the identifying of the trend.

18 Claims, 16 Drawing Sheets

500

510 — PATENT    SEARCH — 520

530
TOP  PEOPLE  JOBS  POSTS  COMPANIES  GROUPS  SCHOOLS

PEOPLE RESULTS FOR "PATENT" - 546,488 RESULTS

JANE DOE — 540
CEO AT PATENT ANALYSIS INC.
CONNECT

JOHN SMITH
PATENT COUNSEL AT ACME CORP.
CONNECT

SEE ALL PEOPLE RESULTS

POSTS RESULTS FOR "PATENT" - 5,997 RESULTS

CHARU JANGID — 550
WHY YOU SHOULD READ "PATENTS ON IMPROVING QUALITY PROFILES"

WEI WANG
MOST IMPORTANT PATENTS FOR SOCIAL NETWORKING SERVICES

SEE ALL POSTS RESULTS 1  2  3  4  5  6  7  8  9  10    NEXT >

| RANKING | PROFILE | IMPRESSION COUNT |
|---|---|---|
| 1 | PROFILE-6 | 124 |
| 2 | PROFILE-57 | 119 |
| 3 | PROFILE-22 | 119 |
| 4 | PROFILE-1 | 113 |
| ... | ... | ... |
| 167 | PROFILE-299 | 58 |
| 168 | PROFILE-107 | 56 |
| ... | ... | ... |
| 299 | PROFILE-8 | 1 |
| 300 | PROFILE-186 | 0 |

| RANKING | PROFILE | SEARCH RANKING (% IN TOP RESULTS) |
|---|---|---|
| 1 | PROFILE-22 | 93 |
| 2 | PROFILE-6 | 92 |
| 3 | PROFILE-107 | 92 |
| 4 | PROFILE-48 | 90 |
| ... | ... | ... |
| 167 | PROFILE-19 | 48 |
| 168 | PROFILE-242 | 48 |
| ... | ... | ... |
| 299 | PROFILE-65 | 1 |
| 300 | PROFILE-4 | 0 |

*FIG. 7*

| PROFILE ELEMENT | LIKELIHOOD OF APPEARING IN SEARCH RESULTS | | | LIKELIHOOD OF BEING RANKED AT TOP OF SEARCH RESULTS | | |
|---|---|---|---|---|---|---|
| | WITHOUT ELEMENT | WITH ELEMENT | UPLIFT | WITHOUT ELEMENT | WITH ELEMENT | UPLIFT |
| POSITION | 4% | 33% | 9X | 17% | 48% | 2.8X |
| SKILLS | 10% | 57% | 6X | 37% | 49% | 1.3X |
| LOCATION | 6% | 31% | 5X | 38% | 48% | 1.3X |
| EDUCATION | 10% | 44% | 4X | 39% | 48% | 1.2X |
| PICTURE | 12% | 51% | 4X | 44% | 48% | 1.1X |
| SUMMARY | 17% | 67% | 4X | 46% | 50% | 1.1X |
| 'PATENT' KEYWORD | 3% | 6% | 2X | 2% | 4% | 2X |
| 'PATENT' POST | 1% | 2% | 2X | 0.5% | 1% | 2X |
| CONNECTED TO JANE DOE | 1% | 2% | 2X | 0.5% | 1% | 2X |
| JOINED PATENT PRACTITIONERS | 2% | 4% | 2X | 1% | 2% | 2X |

REDUCING ELECTRONIC RESOURCE CONSUMPTION USING SEARCH DATA

TECHNICAL FIELD

The present application relates generally to methods and systems of reducing electronic resource consumption using search data.

BACKGROUND

Online services, such as social networking services, often suffer from a lack of data for profiles of members or other users. This lack of data can cause technical problems in the performance of the online service. For example, in situations where the online service is performing a search based on search criteria for a certain type of data, members are often omitted from the search because their profiles lack that type of data even though they would have satisfied the search criteria if the members had included the corresponding data for their profiles. As a result, the accuracy and completeness of the search results are diminished. Additionally, since otherwise relevant search results are omitted, users often spend a longer time on their search, consuming electronic resources (e.g., network bandwidth, computational expense of server performing search). Other technical problems from such omissions can arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 5 illustrates a graphical user interface (GUI) displaying a search results page, in accordance with an example embodiment.

FIG. 6 illustrates a ranking of a cohort of profiles based on their corresponding impression counts, in accordance with an example embodiment.

FIG. 7 illustrates a ranking of a cohort of profiles based on their corresponding search ranking data, in accordance with an example embodiment.

FIG. 13 illustrates an analysis of the effects of the presence and absence of different features on search appearance data of profiles, in accordance with an example embodiment.

DETAILED DESCRIPTION

Figure 1:
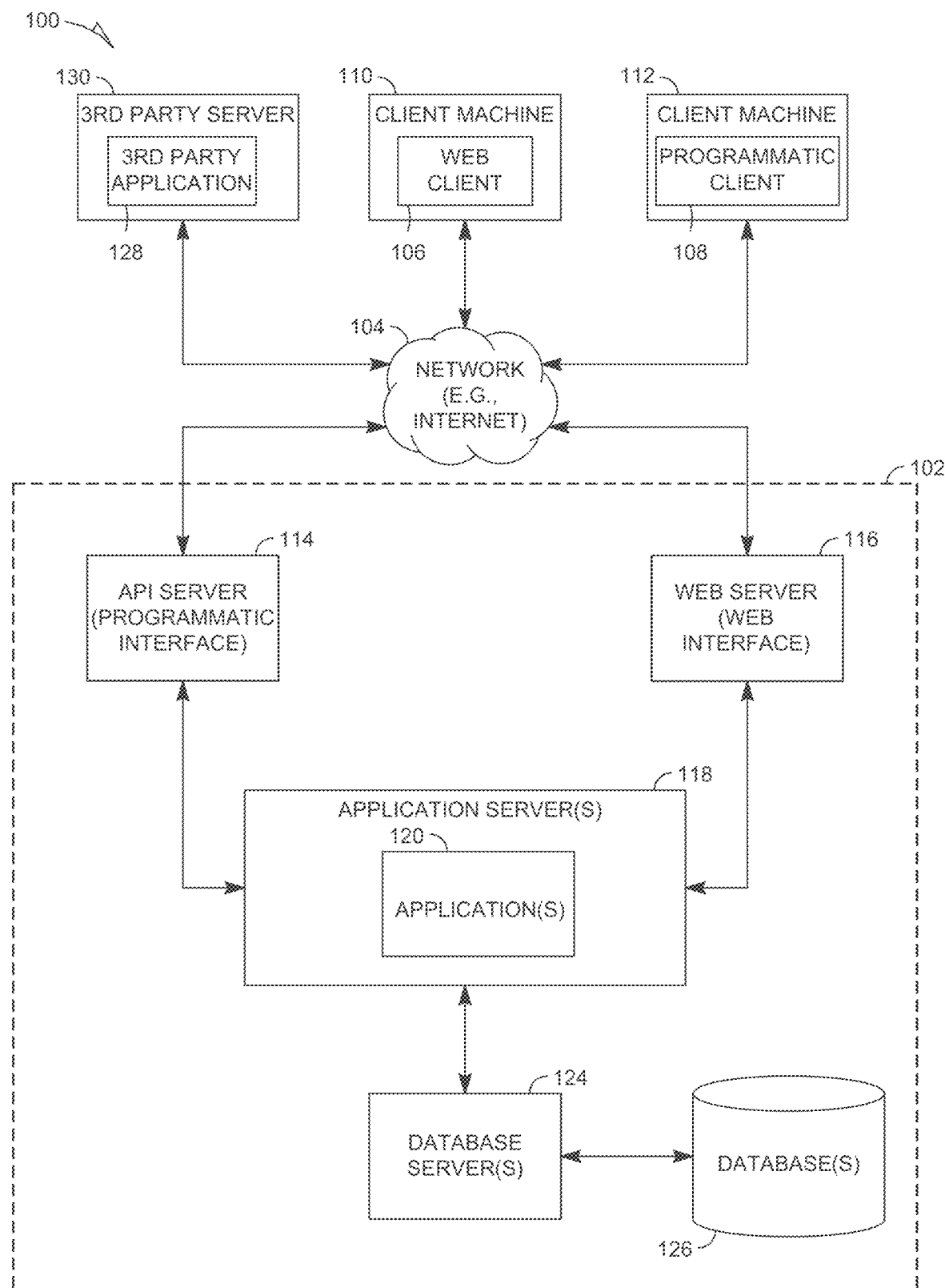
FIG. 1 is a block diagram illustrating a client-server system, in accordance with an example embodiment.

Example methods and systems of reducing electronic resource consumption using search data are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to reduce electronic resource consumption using search data In some example embodiments, a specially-configured computer system analyzes features of reference profiles having search appearance data (e.g., impression counts and/or search ranking data) that satisfies particular specified criteria to identify a trend of at least one feature among the reference profiles, and then transmits a recommendation, or other indication, of the feature(s) for display on a computing device of a user associated with a target profile having search appearance data that satisfies another particular specified criteria and that does not have the feature(s) based on the identifying of the trend. Additionally, other technical effects will be apparent from this disclosure as well.

Any of the features disclosed herein with respect to the term "member" may also apply to other users of an online service who may not technically be members of the online service, and vice-versa.

In some example embodiments, operations are performed by a computer system (or other machine) having a memory and at least one hardware processor, with the operations comprising: receiving corresponding profile data for each one of a plurality of profiles of users of a social networking service, identifying a first cohort of profiles from the plurality of profiles based on a determination that at least one attribute is shared among the profile data of each one of the profiles of the first cohort of profiles; receiving corresponding search appearance data for each one of the profiles of the first cohort of profiles, the corresponding search appearance data comprising an impression count indicating a number of times the profile has been included in search results during a time period; selecting a first plurality of reference profiles from the first cohort of profiles based on a determination that the corresponding impression counts of the first plurality of reference profiles each satisfy a first impression criteria, selecting a first target profile from the first cohort of profiles based on a determination that the impression count of the first target profile satisfies a second impression criteria different from the first impression criteria, the first target profile being distinct from the first plurality of reference profiles; identifying a first trend among the first plurality of reference profiles based on a first trend criteria, the first trend corresponding to at least one feature that is determined to not be associated with the first target profile; and causing an indication of the at least one feature to be displayed on a computing device of the user of the first target profile based on the identifying of the first trend.

In some example embodiments, the selecting the first plurality of reference profiles comprises: ranking the profiles in the first cohort of profiles based on their corresponding impression counts, and selecting the first plurality of reference profiles based on the their ranking, the first impression criteria comprising the ranking of the first plurality of reference profiles indicating that their corresponding impression counts are within a highest portion amongst the impression counts of the profiles in the first cohort of profiles. In some example embodiments, the selecting the first target profile comprises selecting the first target profile based on its ranking, the second impression criteria comprising the ranking of the first target profile indicating that its impression count is within a lowest portion amongst the impression counts of the profiles in the first cohort of profiles.

In some example embodiments, the at least one attribute comprises at least one of an industry, a job title, a company, and a location. In some example embodiments, the operations further comprise: identifying a second cohort of profiles from the plurality of profiles based on a determination that a first attribute and a second attribute are shared among the profile data of each one of the profiles of the second cohort of profiles; receiving corresponding search appearance data for each one of the profiles of the second cohort of profiles, the corresponding search appearance data comprising an impression count indicating a number of times the profile has been included in search results during a time period; selecting a second plurality of reference profiles from the second cohort of profiles based on a determination that the corresponding impression counts of the second plurality of reference profiles each satisfy the first impression criteria; and determining that the first trend criteria is not satisfied by the second plurality of reference profiles, wherein the identifying the first cohort of profiles from the plurality of profiles is performed based on the determination that the first trend criteria is not satisfied by the second plurality of reference profiles, the at least one attribute upon which the identifying of the first cohort of profiles is based comprising the first attribute and not including the second attribute.

In some example embodiments, the at least one feature comprises at least one profile section for which data is stored, and the trend criteria comprises a minimum threshold portion of the first plurality of reference profiles having data stored in association with the at least one profile section. In some example embodiments, the at least one feature comprises at least one keyword, and the trend criteria comprises a minimum threshold portion of the first plurality of reference profiles having the at least one keyword stored as profile data. In some example embodiments, the at least one feature comprises at least one content, and the trend criteria comprises a minimum threshold portion of the first plurality of reference profiles having posted the at least one content. In some example embodiments, the at least one feature comprises at least one profile to which the target profile is not connected, and the trend criteria comprises a minimum threshold portion of the first plurality of reference profiles being connected to the at least one profile. In some example embodiments, the indication of the at least one feature comprises a recommendation to connect with the at least one profile. In some example embodiments, a position of the at least one profile within a list of profiles included in the recommendation is determined based on the identifying of the first trend. In some example embodiments, the at least one feature comprises at least one group to which the first target profile has not joined, and the trend criteria comprises a minimum threshold portion of the first plurality of reference profiles having joined the at least one group.

In some example embodiments, the search appearance data further comprises corresponding search ranking data for each one of the profiles of the first cohort of profiles, the search ranking data comprises an indication of a position of the corresponding profile within search results for each time the corresponding profile was included within search results during the time period, and the operations further comprise: selecting a second plurality of reference profiles from the first cohort of profiles based on a determination that the corresponding search ranking data of the second plurality of reference profiles each satisfy a first ranking criteria, selecting a second target profile from the first cohort of profiles based on a determination that the search ranking data of the second target profile satisfies a second ranking criteria different from the first ranking criteria, the second target profile being distinct from the second plurality of reference profiles; identifying a second trend among the second plurality of reference profiles based on a second trend criteria, the second trend corresponding to one or more features that are determined to not be associated with the second target profile, and causing an indication of the one or more features to be displayed on a computing device of the user of the second target profile based on the identifying of the second trend.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
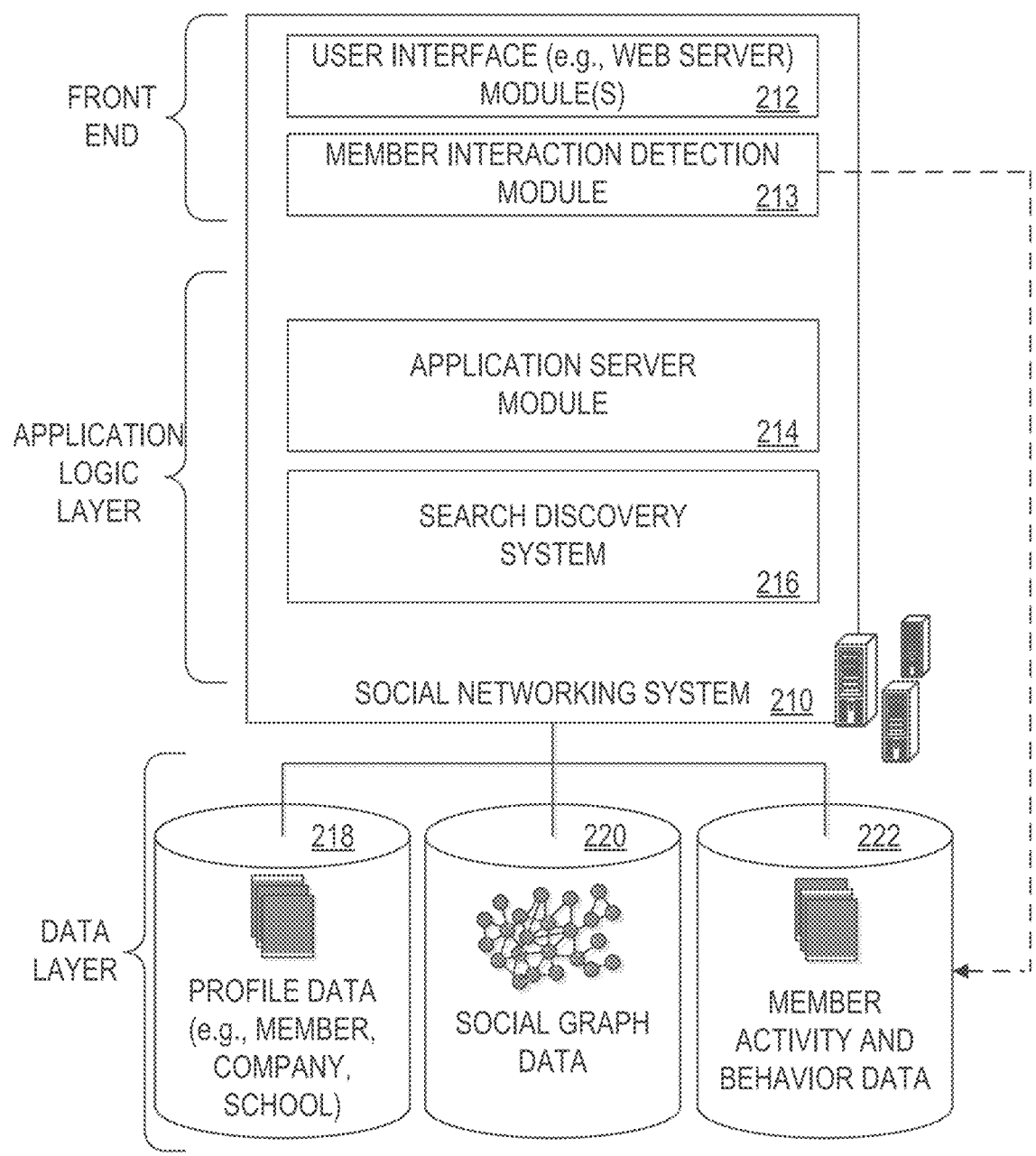
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a search discovery system 216, for use in social networking system 210, consistent with some embodiments of the present disclosure. In some embodiments, the search discovery system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the search discovery system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the search discovery system 216.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the search discovery system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
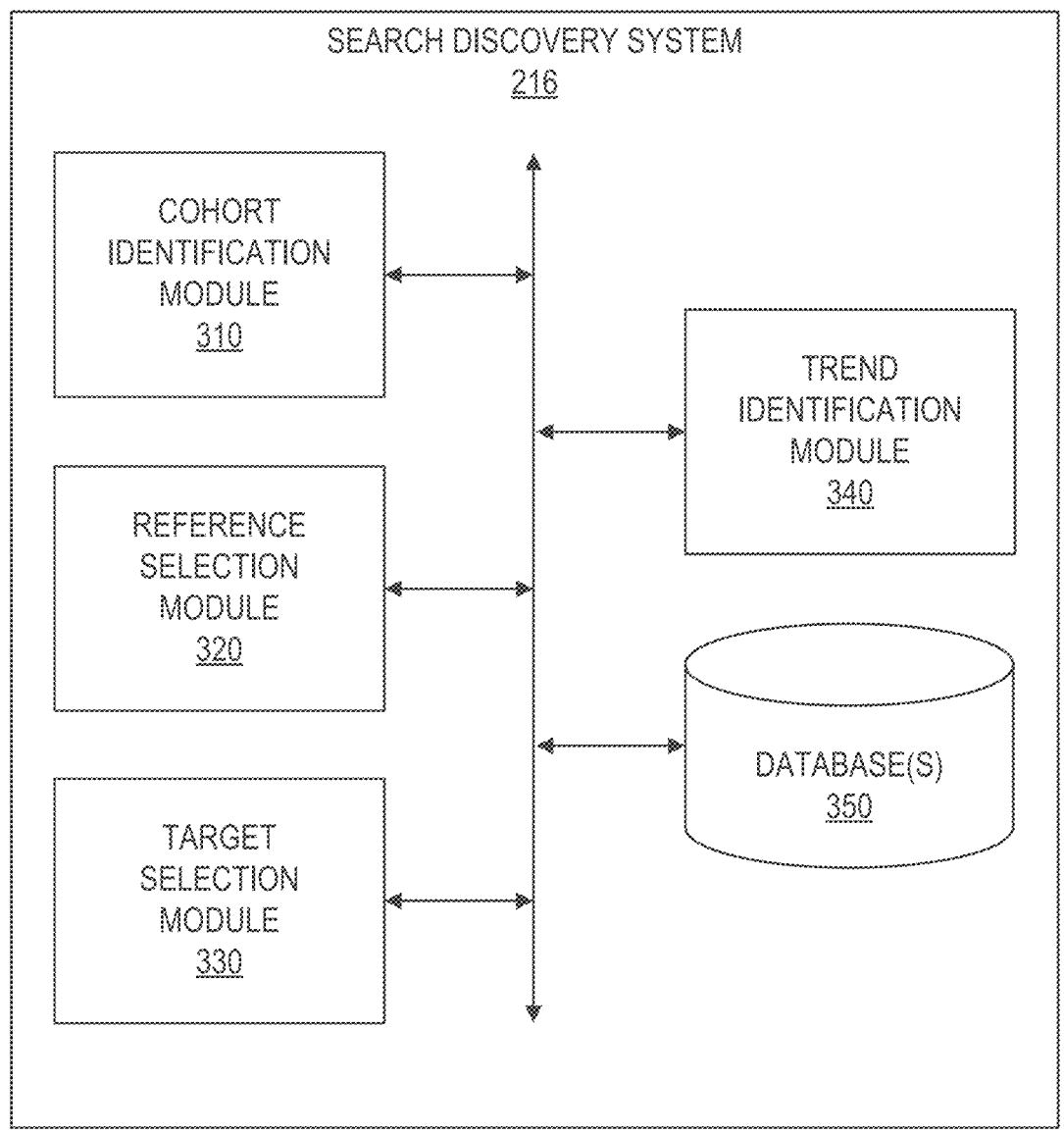
FIG. 3 is a block diagram illustrating components of a search discovery system, in accordance with an example embodiment.

FIG. 3 is a block diagram illustrating components of the search discovery system 216, in accordance with an example embodiment. In some embodiments, the comment relevance system 216 comprises any combination of one or more of a cohort identification module 310, a reference selection module 320, a target selection module 330, a trend identification module 340, and one or more database(s) 350. The modules 310, 320, 330, and 340, and the database(s) 350 can reside on a computer system, or other machine, having a memory and at least one processor (not shown). In some embodiments, the modules 310, 320, 330, and 340, and the database(s) 350 can be incorporated into the application server(s) 118 in FIG. 1. In some example embodiments, the database(s) 350 is incorporated into database(s) 126 in FIG. 1 and can include any combination of one or more of databases 218, 220, and 222 in FIG. 2. However, it is contemplated that other configurations of the modules 310, 320, 330, and 340, and the database(s) 350, are also within the scope of the present disclosure.

In some example embodiments, one or more of the modules 310, 320, 330, and 340 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, 330, and 340 is configured to receive user input. For example, one or more of the modules 310, 320, 330, and 340 can present one or more GUI elements (e.g., drop-down menu, selectable buttons, text field) with which a user can submit input.

In some example embodiments, one or more of the modules 310, 320, 330, and 340 is configured to perform various communication functions to facilitate the functionality described herein, such as by communicating with the social networking system 210 via the network 104 using a wired or wireless connection. Any combination of one or more of the modules 310, 320, 330, and 340 may also provide various web services or functions, such as retrieving information from the third party servers 130 and the social networking system 210. Information retrieved by the any of the modules 310, 320, 330, and 340 may include profile data corresponding to users and members of the social networking service of the social networking system 210.

Additionally, any combination of one or more of the modules 310, 320, 330, and 340 can provide various data functionality, such as exchanging information with database(s) 350 or servers. For example, any of the modules 310, 320, 330, and 340 can access member profiles that include profile data from the database(s) 350, as well as extract attributes and/or characteristics from the profile data of member profiles. Furthermore, the one or more of the modules 310, 320, 330, and 340 can access social graph data and member activity and behavior data from database(s) 350, as well as exchange information with third party servers 130, client machines 110, 112, and other sources of information.

In some example embodiments, the cohort identification module 310 is configured to receive corresponding profile data for each one of a plurality of profiles of users of an online service. For example, the cohort identification module 310 may access and retrieve profile data from database 218 for each one, or some other plurality, of the member profiles of the social networking service of FIG. 2. In In some example embodiments, the profile data comprises any combination of one or more of the member profile data stored in database 218 of FIG. 2, including, but not limited to, one or more industries, a current job title, a current company with which the user is employed, a location, an age, a gender, one or more interests, educational background data (e.g., schools, majors, matriculation and/or graduation dates, etc.), employment history data, one or more skills of the user, and one or more professional organizations.

In some example embodiments, the cohort identification module 310 is configured to identify a cohort of profiles from the plurality of profiles based on a determination that at least one attribute is shared among the profile data of each one of the profiles of the cohort of profiles. For example, the cohort identification module 310 may identify all of the profiles having profile data indicating that the corresponding user of the profile is part of a particular industry (e.g., patent law) as being part of a particular cohort, thereby identifying a cohort of profiles having a common industry.

Figure 4:
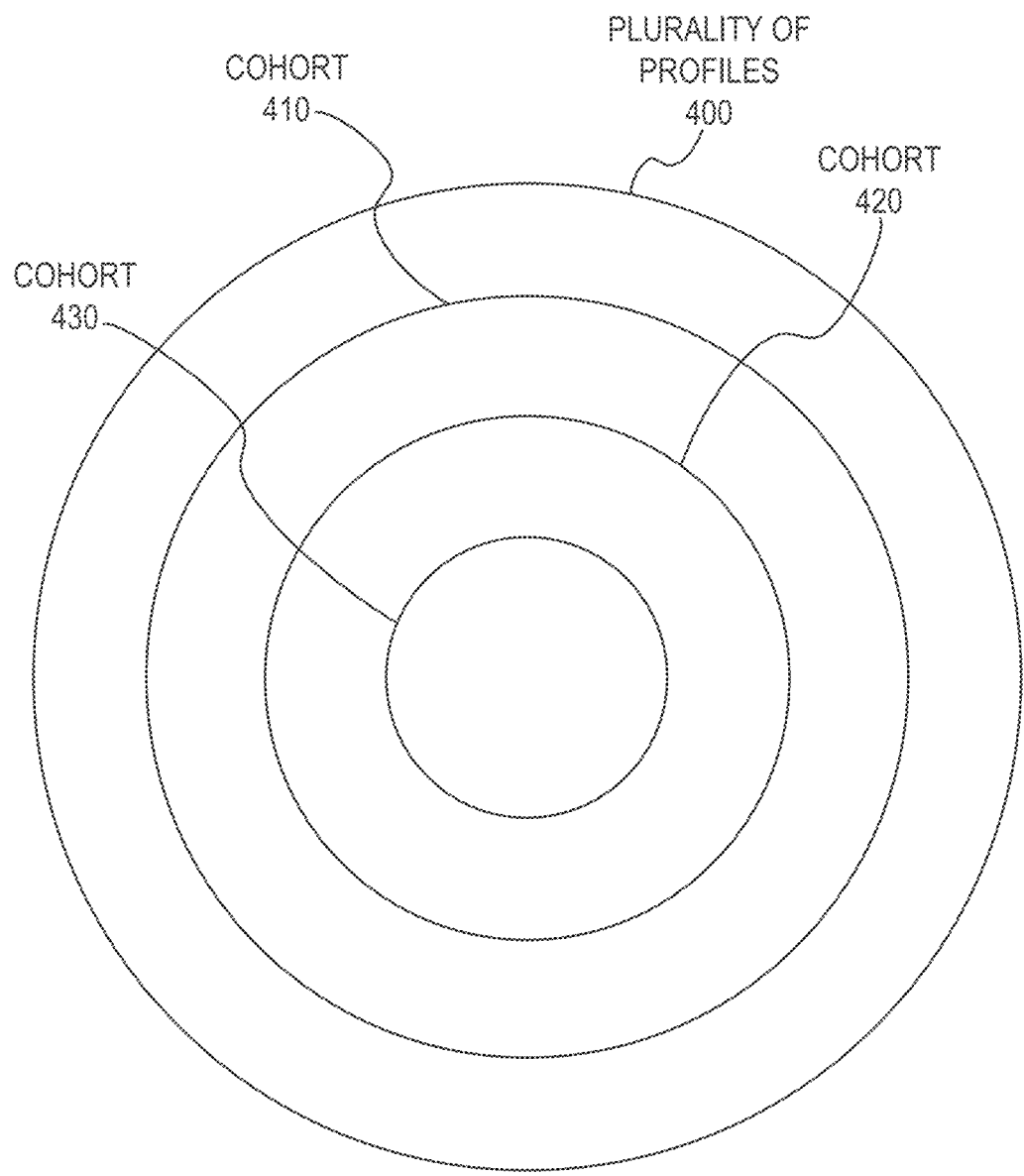
FIG. 4 illustrates a conceptual diagram of different cohorts of profiles within a plurality of profiles of an online service, in accordance with an example embodiment.

It is contemplated that the cohort identification module 310 may identify different cohorts of profiles, including cohorts of different scopes. FIG. 4 illustrates a conceptual diagram of different cohorts 410, 420, and 430 of profiles within a plurality of profiles 400 of an online service, in accordance with an example embodiment. In FIG. 4, the different cohorts 410, 420, and 430 have each been identified from the plurality of profiles 400 based on an analysis of the profile data of the plurality of profiles 400. Here, the cohort identification module 310 has different cohorts with different scopes. For example, based on the analysis of the profile data of the plurality of profiles, the cohort identification module 310 may determine that a particular group of profiles from the plurality of profiles are all associated with the same industry (e.g., each profile in the group comprises profile data indicating that the corresponding user works in the industry of patent law), and identify that particular group of profiles as cohort 410.

Additionally, based on the analysis of the profile data of the plurality of profiles, the cohort identification module 310 may also determine that a particular group of profiles from the plurality of profiles are all associated with the same industry (e.g., each profile in the group comprises profile data indicating that the corresponding user works in the industry of patent law) and with the same job title (e.g., each profile in the group comprises profile data indicating that the corresponding user has a job title of patent attorney), and identify that particular group of profiles as cohort 420.

Furthermore, based on the analysis of the profile data of the plurality of profiles, the cohort identification module 310 may also determine that a particular group of profiles from the plurality of profiles are all associated with the same industry (e.g., each profile in the group comprises profile data indicating that the corresponding user works in the industry of patent law) and with the same job title (e.g., each profile in the group comprises profile data indicating that the corresponding user has a job title of patent attorney), as well as with the same company (e.g., each profile in the group comprises profile data indicating that the corresponding user is employed at Acme Inc.), and identify that particular group of profiles as cohort 430.

As seen in FIG. 4, the more attributes that are used as the basis for identifying a cohort, the smaller the scope of that particular cohort. For example, in FIG. 4, cohort 420 has a smaller scope than cohort 410, since cohort 420 adds an additional attribute as the basis of its identification as a cohort that is not used as the basis for the identification of cohort 410 (e.g., same industry and same job title for cohort 420 versus same industry for cohort 410), and cohort 430 has a smaller scope than cohort 420, since cohort 430 adds an additional attribute as the basis of its identification as a cohort that is not used as the basis for the identification of cohort 420 (e.g., same industry and same job title and same company for cohort 430 versus same industry and same job title for cohort 420).

It is contemplated that other cohorts and other scopes of cohorts other than those shown in FIG. 4 are also within the scope of the present disclosure Additionally, although FIG. 4 shows the different scopes of the different cohorts as being concentric circles, the cohort identification module 310 is capable of identifying different cohorts having overlapping, yet not concentric, scopes.

In some example embodiments, the reference selection module 320 is configured to receive corresponding search appearance data for each one of the profiles of the identified cohort of profiles. The search appearance data may be accessed and retrieved from database(s) 350. In some example embodiments, the corresponding search appearance data may comprise an impression count indicating a number of times the profile has been included in search results during a time period (e.g., within the last 30 days).

FIG. 5 illustrates a graphical user interface (GUI) 500 displaying a search results page, in accordance with an example embodiment. In FIG. 5, the search results page displayed within GUI 500 comprises a text field 510 within which a keyword (e.g., "PATENT") has been entered and submitted as a search query using a selectable user interface element 520 (e.g., a "SEARCH" button). The search results page shown in FIG. 5 comprises a plurality of selectable user interface elements 530 each corresponding to a different filtering parameter for displaying the search results of the submitted search query. For example, in FIG. 5, the user viewing the search results page may select what type of search results to view, such as search results comprising only profiles of people (e.g., "PEOPLE"), search results comprising only job listings (e.g., "JOBS"), search results comprising only online posts (e.g., "POSTS"), search results comprising only profiles of companies (e.g., "COMPANIES"), search results comprising only profiles of groups (e.g., "GROUPS"), search results comprising only profiles of schools (e.g., "SCHOOLS"), and/or all of the top search results regardless of the type (e.g., "TOP").

In the example embodiment shown in FIG. 5, the search results page displays search results 540 for profiles of people found for the submitted search query "PATENT," as well as search results 550 for online posts found for the submitted search query "PATENT." The identification of the profile of "JANE DOE" within the search results 540 displayed on the search results page within GUI 500 may be interpreted as an impression event included in the impression count for the profile of "JANE DOE." The impression counts may be stored as search appearance data for their corresponding profiles in database(s) 350.

The corresponding search appearance data may additionally or alternatively comprise corresponding search ranking data for each one of the profiles of the identified cohort of profiles. The search ranking data comprises an indication of a position of the corresponding profile within search results for each time the corresponding profile was included within search results during the time period (e.g., within the last 30 days). In the example embodiment shown in FIG. 5, search appearance data for the profile of "JANE DOE" may indicate that the profile of "JANE DOE" was the top ranked profile in the search results for search query "PATENT." This search ranking data may be stored as search appearance data in database(s) 350.

In some example embodiments, the reference selection module 320 is configured to select a plurality of reference profiles from the cohort of profiles based on a determination that the corresponding impression counts of the plurality of reference profiles each satisfy a first impression criteria. For example, the selecting of the plurality of reference profiles may comprise ranking the profiles in the cohort of profiles based on their corresponding impression counts, and then selecting the plurality of reference profiles based on the their ranking. FIG. 6 illustrates a ranking 600 of a cohort of profiles (e.g., 300 profiles) based on their corresponding impression counts, in accordance with an example embodiment In the example embodiment shown in FIG. 6. PROFILE-6 is the highest ranking profile among the cohort of profiles based on it having the highest impression count among the cohort of profiles, PROFILE-57 is the second highest ranking profile among the cohort of profiles based on it having the second highest impression count among the cohort of profiles, and so on and so forth until the lowest ranking profile among the cohort of profiles, which is shown in FIG. 6 as PROFILE-186 having the lowest impression count among the cohort of profiles.

In some example embodiments, the first impression criteria comprises the ranking of the plurality of reference profiles indicating that their corresponding impression counts are within a highest portion amongst the impression counts of the profiles in the cohort of profiles. For example, in FIG. 6, the reference selection module 320 may select PROFILE-6, PROFILE-57, PROFILE-22, and PROFILE-1 as the reference profiles based on their ranking as the top four ranked profiles in the ranking 600. It is contemplated that other types of highest portions may be used as well, such as the top n % of ranked profiles. Additionally or alternatively, the first impression criteria may comprise a minimum threshold impression count (e.g. a minimum impression count of 100 impression events), such that any profile having an impression count at the minimum threshold impression count or higher (e.g., at least 100 impression events) is selected as one of the reference profiles. Other types of first impression criteria may be used as well.

Referring back to FIG. 3, in some example embodiments, the target selection module 330 is configured to select a target profile from the cohort of profiles based on a determination that the impression count of the target profile satisfies a second impression criteria different from the first impression criteria, with the target profile being distinct from the plurality of reference profiles. For example, in some example embodiments, the second impression criteria may be used by the target selection module 330 to identify a target profile that will likely receive an improvement in its search appearance data if it is updated to include one or more features of the selected reference profiles. In some example embodiments, the target selection module 330 is configured to select the target profile based on its ranking, with the second impression criteria comprising the ranking of the target profile indicating that its impression count is within a lowest portion amongst the impression counts of the profiles in the cohort of profiles. For example, in FIG. 6, the target selection module 330 may select PROFILE-8 and PROFILE-186 as target profiles based on their ranking as the two lowest ranked profiles in the ranking 600. It is contemplated that other types of lowest portions may be used as well, such as the bottom n % of ranked profiles. Additionally or alternatively, the second impression criteria may comprise a maximum threshold impression count (e.g. a maximum impression count of 1 impression event), such that any profile having an impression count at the maximum threshold impression count or lower (e.g., no more than 1 impression event) is selected as a target profile. Other types of second impression criteria may be used as well.

In some example embodiments, the reference selection module 320 and the target selection module 330 are configured to perform the operations discussed above, using search ranking data of the profiles as the basis for selection in addition or as an alternative to using the impression counts of the profiles as the bases for selection. For example, the reference selection module 320 may select a plurality of reference profiles from the cohort of profiles based on a determination that the corresponding search ranking data of the plurality of reference profiles each satisfy a first ranking criteria, and the target selection module 330 may select a target profile from the cohort of profiles based on a determination that the search ranking data of the target profile satisfies a second ranking criteria different from the first ranking criteria, with the target profile being distinct from the plurality of reference profiles.

In some example embodiments, the selecting of the plurality of reference profiles may comprise ranking the profiles in the cohort of profiles based on their corresponding search ranking data, and then selecting the plurality of reference profiles based on the their ranking. FIG. 7 illustrates a ranking 700 of a cohort of profiles (e.g., 300 profiles) based on their corresponding search ranking data, in accordance with an example embodiment. In the example embodiment shown in FIG. 7, PROFILE-22 is the highest ranking profile among the cohort of profiles based on it having the highest frequency of appearing in a top n number of search results (e.g., PROFILE-22 is ranked in the top 10 search results 93% of the time), PROFILE-6 is the second highest ranking profile among the cohort of profiles based on it having the second highest frequency of appearing in a top n number of search results (e.g., PROFILE-6 is ranked in the top 10 search results 92% of the time), and so on and so forth until the lowest ranking profile among the cohort of profiles, which is shown in FIG. 7 as PROFILE-4 having the lowest search ranking data among the cohort of profiles.

It is contemplated that other standards for ranking the profiles based on their search ranking criteria may be used. For example, for each instance in which a profile is included in search results, its position within the search results (e.g., ranked as the 6th search result from top to bottom) may be stored, and then the average of the stored positions for that profile may calculated and used as the search ranking data upon which the ranking 700 of the cohort of profiles is based.

In some example embodiments, the first ranking criteria comprises the ranking of the plurality of reference profiles indicating that their corresponding search ranking data are within a highest portion amongst the search ranking data of the profiles in the cohort of profiles. For example, in FIG. 7, the reference selection module 320 may select PROFILE-22, PROFILE-6, PROFILE-107, and PROFILE-48 as the reference profiles based on their ranking as the top four ranked profiles in the ranking 700. It is contemplated that other types of highest portions may be used as well, such as the top n % of ranked profiles. Additionally or alternatively, the first ranking criteria may comprise a minimum threshold search ranking data (e.g. a minimum frequency of being in the top results 90% of the time), such that any profile having search ranking data at the minimum threshold search ranking data or higher (e.g., at least 90% frequency in the top results) is selected as one of the reference profiles. Other types of first ranking criteria may be used as well.

Referring back to FIG. 3, in some example embodiments, the target selection module 330 is configured to select a target profile from the cohort of profiles based on a determination that the search ranking data of the target profile satisfies a second ranking criteria different from the first ranking criteria, with the target profile being distinct from the plurality of reference profiles. For example, in some example embodiments, the second ranking criteria may be used by the target selection module 330 to identify a target profile that will likely receive an improvement in its search ranking data if it is updated to include one or more features of the selected reference profiles. In some example embodiments, the target selection module 330 is configured to select the target profile based on its ranking, with the second ranking criteria comprising the ranking of the target profile indicating that its search ranking data is within a lowest portion amongst the search ranking data of the profiles in the cohort of profiles. For example, in FIG. 7, the target selection module 330 may select PROFILE-65 and PROFILE-4 as target profiles based on their ranking as the two lowest ranked profiles in the ranking 700. It is contemplated that other types of lowest portions may be used as well, such as the bottom n % of ranked profiles. Additionally or alternatively, the second ranking criteria may comprise a maximum threshold search ranking data (e.g. a maximum frequency of being in the top results 1% of the time), such that any profile having search ranking data at the maximum threshold search ranking data or lower (e.g., no more than a frequency of being in the top results 1% of the time) is selected as a target profile. Other types of second ranking criteria may be used as well.

Referring back to FIG. 3, in some example embodiments, the trend identification module 340 is configured to identify a trend among the plurality of reference profiles based on a trend criteria, with the trend corresponding to at least one feature that is determined to not be associated with the first target profile. For example, the trend criteria may comprise a minimum threshold portion of the plurality of reference profiles having the feature (e.g., at least 90% of the reference profiles have the feature). In some example embodiments, the trend identification module 340 is configured to cause an indication of the feature(s) to be displayed on a computing device of the user of the target profile based on the identifying of the trend. For example, the trend identification module 340 may cause the display of at least one of a notification of the identified trend and a recommendation of the feature(s) corresponding to the identified trend.

Figure 8:
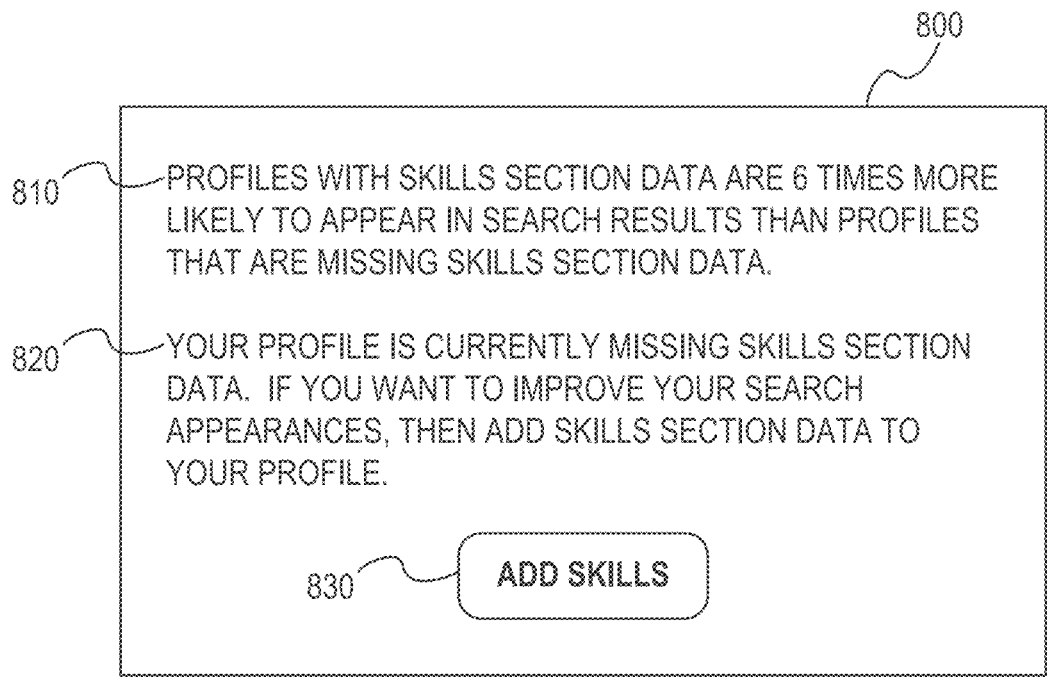
FIG. 8 illustrates a GUI in which an indication of a profile section feature is displayed, in accordance with an example embodiment.

In some example embodiments, the feature(s) comprises at least one profile section for which data is stored, and the trend criteria comprises a minimum threshold portion of the plurality of reference profiles having data stored in association with the at least one profile section. FIG. 8 illustrates a GUI 800 in which an indication of a profile section feature is displayed, in accordance with an example embodiment. As shown in FIG. 8, the indication may comprise an indication 810 of the identified trend of a profile section feature (e.g., "SKILLS SECTION DATA") and a prompting 820 for the user to perform an action to associate the profile section feature with the profile of the user (e.g., "ADD SKILLS SECTION DATA TO YOUR PROFILE"), along with a selectable user interface element 830 configured to trigger a computer process for associating the profile section feature with the profile of the user (e.g., "ADD SKILLS" button). It is contemplated that other types and configurations of indications are also within the scope of the present disclosure.

Figure 9:
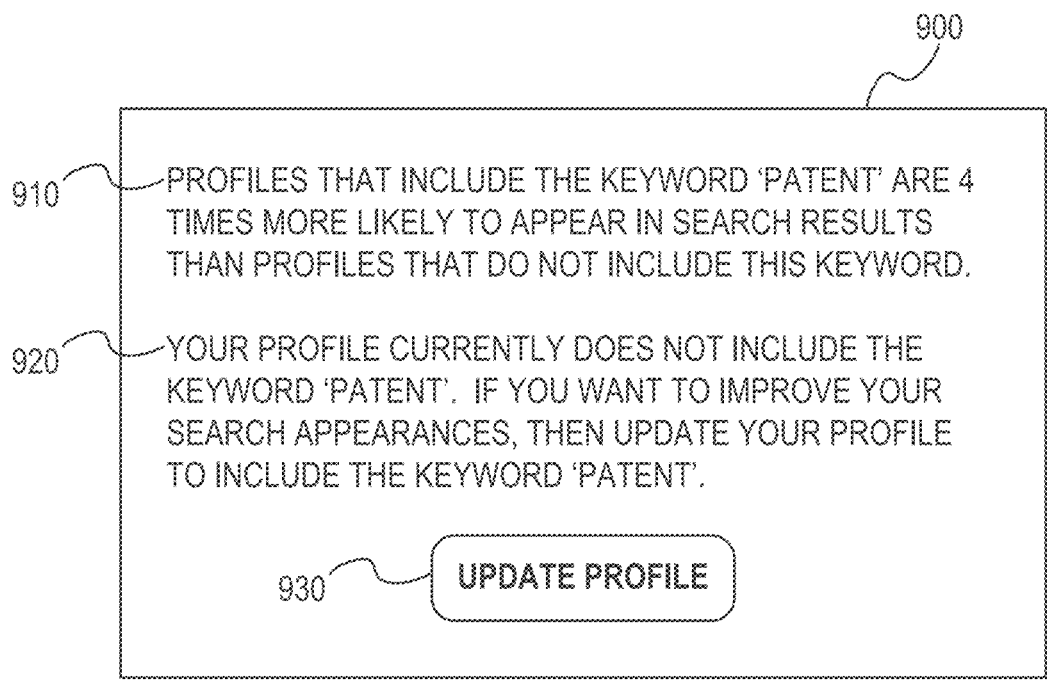
FIG. 9 illustrates a GUI in which an indication of a keyword feature is displayed, in accordance with an example embodiment.

In some example embodiments, the feature(s) comprises at least one keyword, and the trend criteria comprises a minimum threshold portion of the plurality of reference profiles having the keyword(s) stored as profile data. FIG. 9 illustrates a GUI 900 in which an indication of a keyword feature is displayed, in accordance with an example embodiment. As shown in FIG. 9, the indication may comprise an indication 910 of the identified trend of a keyword feature (e.g., KEYWORD "PATENT") and a prompting 920 for the user to perform an action to associate the keyword feature with the profile of the user (e.g., UPDATE YOUR PROFILE TO INCLUDE THE KEYWORD "PATENT"), along with a selectable user interface element 930 configured to trigger a computer process for associating the keyword feature with the profile of the user (e.g., "UPDATE PROFILE" button).

It is contemplated that other types and configurations of indications are also within the scope of the present disclosure.

Figure 10:
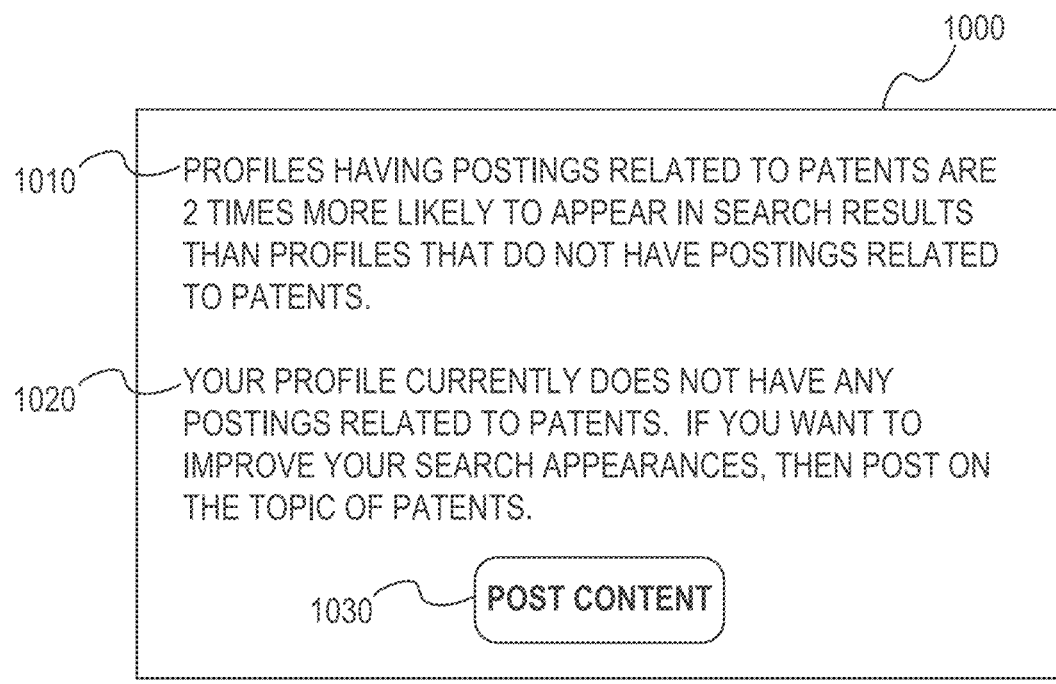
FIG. 10 illustrates a GUI in which an indication of a post content feature is displayed, in accordance with an example embodiment.

In some example embodiments, the feature(s) comprises at least one content, and the trend criteria comprises a minimum threshold portion of the plurality of reference profiles having posted the content(s). FIG. 10 illustrates a GUI 1000 in which an indication of a post content feature is displayed, in accordance with an example embodiment. As shown in FIG. 10, the indication may comprise an indication 1010 of the identified trend of the post content feature (e.g., "POSTINGS RELATED TO PATENTS") and a prompting 1020 for the user to perform an action to associate the post content feature with the profile of the user (e.g., "POST ON THE TOPIC OF PATENTS"), along with a selectable user interface element 1030 configured to trigger a computer process for associating the post content feature with the profile of the user (e.g., "POST CONTENT" button). It is contemplated that other types and configurations of indications are also within the scope of the present disclosure.

Figure 11:
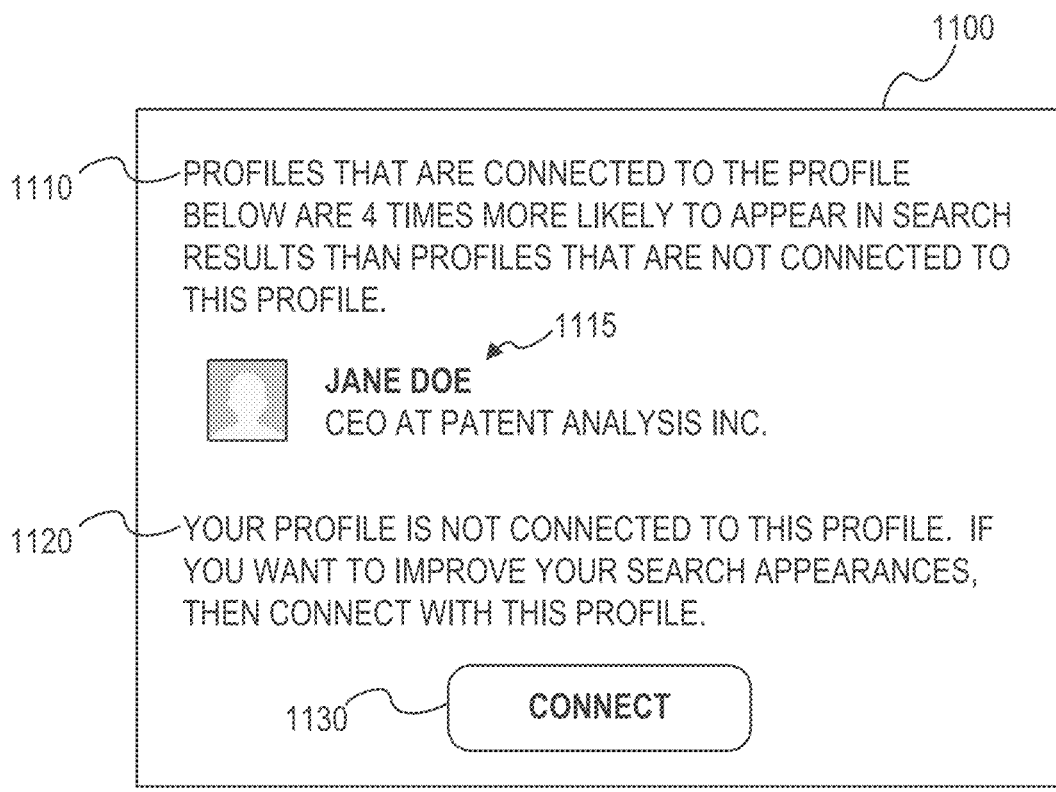
FIG. 11 illustrates a GUI in which an indication of a connection feature is displayed, in accordance with an example embodiment.

In some example embodiments, the feature(s) comprises at least one profile to which the target profile is not connected, and the trend criteria comprises a minimum threshold portion of the plurality of reference profiles being connected to the profile(s) FIG. 11 illustrates a GUI 1100 in which an indication of a connection feature is displayed, in accordance with an example embodiment. As shown in FIG. 11, the indication may comprise an indication 1110 of the identified trend of the connection feature (e.g., "CONNECTED TO THE PROFILE BELOW"), an identification 1115 of the profile to which the target profile is not connected (e.g., "JANE DOE"), and a prompting 1120 for the user to perform an action to associate the connection feature with the profile of the user (e.g., "CONNECT WITH THIS PROFILE"), along with a selectable user interface element 1130 configured to trigger a computer process for associating the connect feature with the profile of the user (e.g., "CONNECT" button). It is contemplated that other types and configurations of indications are also within the scope of the present disclosure.

In some example embodiments, the indication of the feature(s) comprises a recommendation to connect with the profile(s). In some example embodiments, a position of the profile(s) within a list of profiles included in the recommendation is determined based on the identifying of the trend. For example, in an example embodiment where a list of profiles is being displayed to the user of the target profile as part of a recommendation for the user to connect with the profiles in the list of profiles, the position of the profile(s) identified by the trend identification module 340 as part of the identified trend may be adjusted or otherwise determined based on the profile(s) being identified by the trend identification module 340 as part of the identified trend (e.g., a particular profile may be listed first in the list of recommended profiles to connect with based on its identification as part of the trend, as opposed to being listed eleventh in the list of recommended profiles to connect with in a scenario where the particular profile is not identified as part of the trend).

Figure 12:
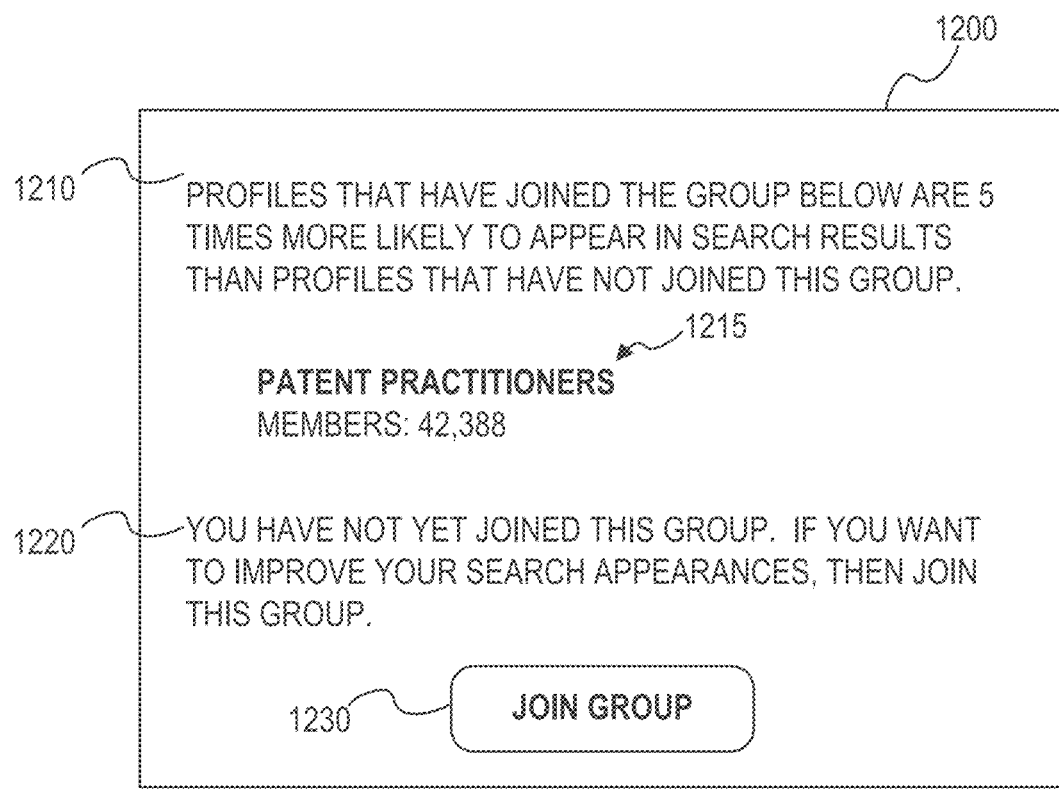
FIG. 12 illustrates a GUI in which an indication of a group feature is displayed, in accordance with an example embodiment.

In some example embodiments, the feature(s) comprises at least one group to which the target profile has not joined, and the trend criteria comprises a minimum threshold portion of the plurality of reference profiles having joined the at group(s). FIG. 12 illustrates a GUI 1200 in which an indication of a group feature is displayed, in accordance with an example embodiment. As shown in FIG. 12, the indication may comprise an indication 1210 of the identified trend of the group feature (e.g., "JOINED THE GROUP BELOW"), an identification 1215 of the group to which the target profile has not joined (e.g., "PATENT PRACTITIONERS"), and a prompting 1220 for the user to perform an action to associate the group feature with the profile of the user (e.g., "JOIN THIS GROUP"), along with a selectable user interface element 1230 configured to trigger a computer process for associating the group feature with the profile of the user (e.g., "JOIN GROUP" button). It is contemplated that other types and configurations of indications are also within the scope of the present disclosure.

FIG. 13 illustrates an analysis 1300 of the effects of the presence and absence of different features on search appearance data of profiles, in accordance with an example embodiment. In FIG. 13, different features listed under the column labelled "PROFILE ELEMENT" are presented in a table of search appearance data (e.g., "LIKELIHOOD OF APPEARING IN SEARCH RESULTS" AND "LIKELIHOOD OF BEING RANKED AT THE TOP OF SEARCH RESULTS") corresponding to the presence of each feature in a profile (e.g., "WITHOUT ELEMENT") and the absence of the each feature in a profile (e.g., "WITH ELEMENT"), as well as the corresponding improvement associated with the present of each feature over the absence of the feature (e.g., "UPLIFT").

Figure 14:
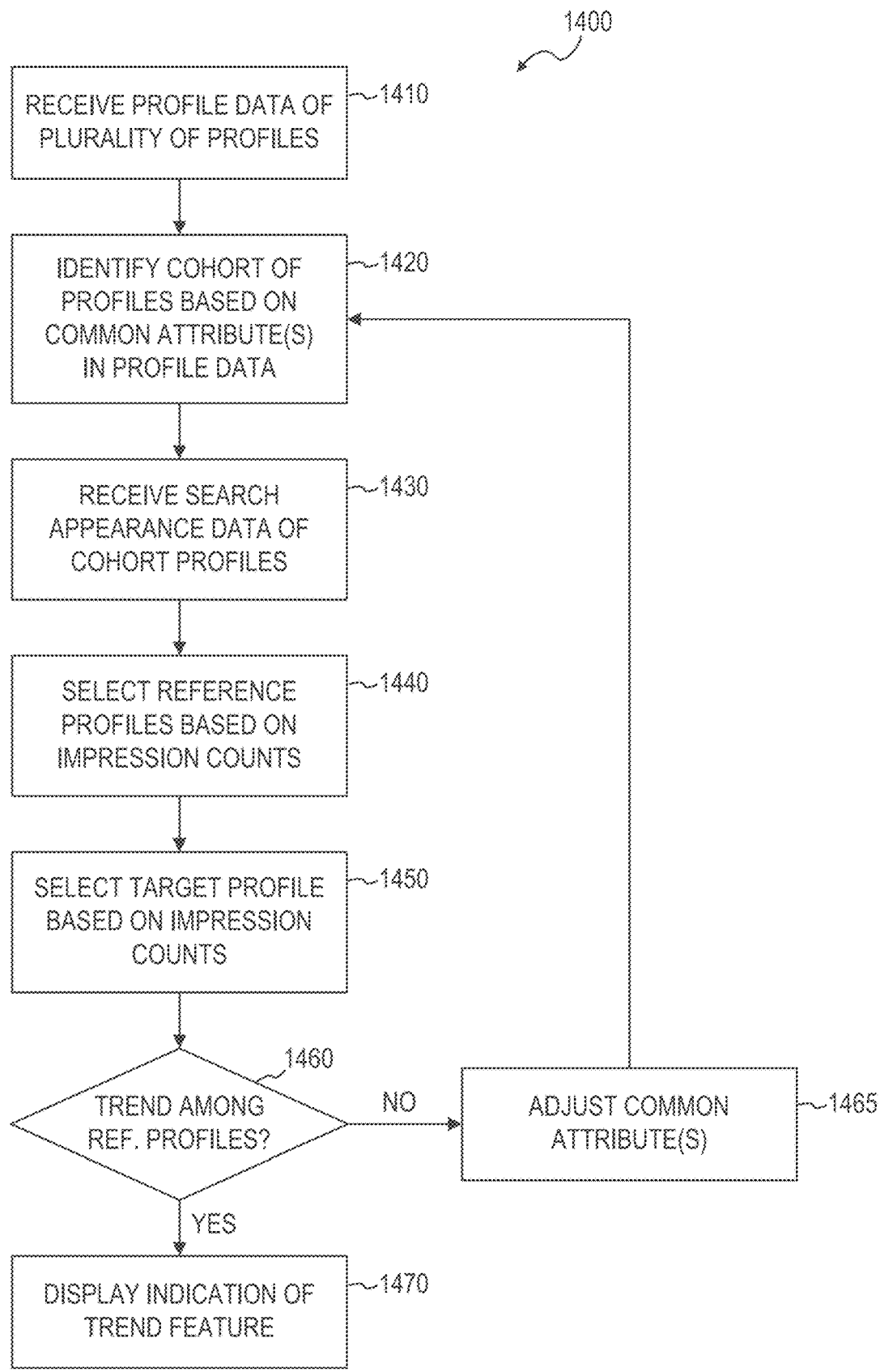
FIG. 14 is a flowchart illustrating a method of identifying a feature to be associated with a profile in order to improve search appearance data of the profile, in accordance with an example embodiment.

FIG. 14 is a flowchart illustrating a method 1400 of identifying a feature to be associated with a profile in order to improve search appearance data of the profile, in accordance with an example embodiment. Method 1400 can be performed by processing logic that can comprise hardware (e.g., circuitry, dedicated logic, programmable logic, microcode, etc.), software (e.g., instructions run on a processing device), or a combination thereof. In one implementation, the method 1400 is performed by the search discovery system 216 of FIGS. 2-3, or any combination of one or more of its modules, as described above.

At operation 1410, the search discovery system 216 receives corresponding profile data for each one of a plurality of profiles of users of a social networking service.

At operation 1420, the search discovery system 216 identifies a cohort of profiles from the plurality of profiles based on a determination that a set of one or more attributes is shared among the profile data of each one of the profiles of the cohort of profiles.

At operation 1430, the search discovery system 216 receives corresponding search appearance data for each one of the profiles of the cohort of profiles, with the corresponding search appearance data comprising an impression count indicating a number of times the profile has been included in search results during a time period.

At operation 1440, the search discovery system 216 selects a plurality of reference profiles from the cohort of profiles based on a determination that the corresponding impression counts of the plurality of reference profiles each satisfy a first impression criteria.

At operation 1450, the search discovery system 216 selects a target profile from the cohort of profiles based on a determination that the impression count of the target profile satisfies a second impression criteria different from the first impression criteria, with the target profile being distinct from the plurality of reference profiles.

At operation 1460, the search discovery system 216 analyzes one or more features of the reference profiles to determine whether or not a trend exists among the plurality of reference profiles. This determination is made based on a trend criteria. In some example embodiments, the trend criteria comprises a minimum threshold portion (e.g., minimum number, minimum percentage) of the plurality of reference profiles having the feature(s) and the target profile not having the feature(s). It, at operation 1460, the search discovery system 216 determines that the trend criteria is satisfied, then the search discovery system 216 identifies the trend of the feature(s), and proceeds to operation 1470, where the search discovery system 216 causes an indication of the feature(s) to be displayed on a computing device of the user of the target profile based on the identifying of the trend.

If, at operation 1460, the search discovery system 216 determines that the trend criteria is not satisfied (e.g., the minimum threshold portion of the plurality of reference profiles having the feature(s) is not met), then the search discovery system 216 proceeds to operation 1465, where the search discovery system 216 attempts to broaden the scope of the cohort to be used in the method 1400, adjusting the common attributes that the search discovery system 216 is attempting to find to be shared among the cohort of profiles. The search discovery system 216 then returns to operation 1420, where the search discovery system 216 identifies another cohort of profiles, different from the previously-identified cohort of profiles, based on a determination that a different set of one or more attributes is shared among the profile data of each one of the profiles of the other cohort of profiles. For example, during the first performance of operation 1420, the search discovery system 216 may have determined the first cohort of profiles based on a determination that each profile in the first cohort of profiles comprised profile data indicating a job industry of patent law and a job title of patent attorney. However, the search appearance data and/or the profile data for the first cohort may be determined by the search discovery system 216 to be insufficient or search discovery system 216 to identify a trend. In response to such a determination, the search discovery system 216 may adjust the criteria for identifying the cohort of profiles in order to obtain additional or different search appearance data and/or profile data sufficient to satisfy the trend criteria. For example, during the repeat performance of operation 1420, the search discovery system 216 may determine the second cohort of profiles based on a determination that each profile in the first cohort of profiles comprised profile data indicating a job industry of patent law, without the requirement that the profile data indicates a job title of patent attorney Such use of an adjustment in the criteria for common attributes among the cohort of profiles acts as a useful remedy in handling situations in which the data being used to identify a trend is insufficient.

It is contemplated that any of the other features described within the present disclosure can be incorporated into method 1400.

Figure 15:
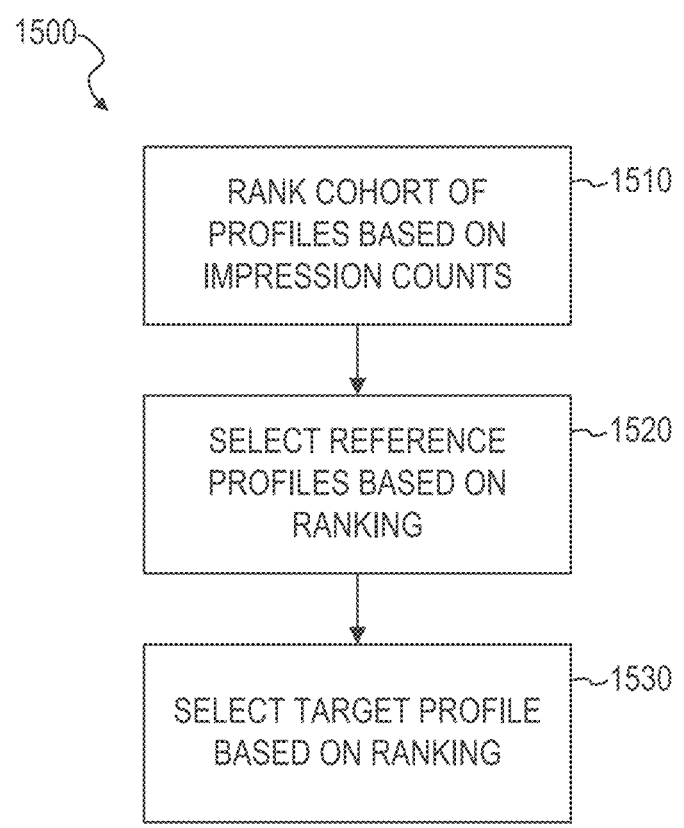
FIG. 15 is a flowchart illustrating a method of selecting reference profiles and a target profile, in accordance with an example embodiment.

FIG. 15 is a flowchart illustrating a method 1500 of selecting reference profiles and a target profile, in accordance with an example embodiment. Method 1500 can be performed by processing logic that can comprise hardware (e.g., circuitry, dedicated logic, programmable logic, microcode, etc.), software (e.g., instructions run on a processing device), or a combination thereof. In one implementation, the method 1500 is performed by the search discovery system 216 of FIGS. 2-3, or any combination of one or more of its modules, as described above.

At operation 1510, the search discovery system 1510 ranks the profiles in the cohort of profiles based on their corresponding impression counts.

At operation 1520, the search discovery system 1520 selects the plurality of reference profiles based on their ranking and a first impression criteria, with the first impression criteria comprising the ranking of the plurality of reference profiles indicating that their corresponding impression counts are within a highest portion amongst the impression counts of the profiles in the cohort of profiles.

At operation 1530, the search discovery system 216 selects the target profile based on its ranking and a second impression criteria, with the second impression criteria comprising the ranking of the target profile indicating that its impression count is within a lowest portion amongst the impression counts of the profiles in the cohort of profiles.

It is contemplated that any of the other features described within the present disclosure can be incorporated into method 1500.

Figure 16:
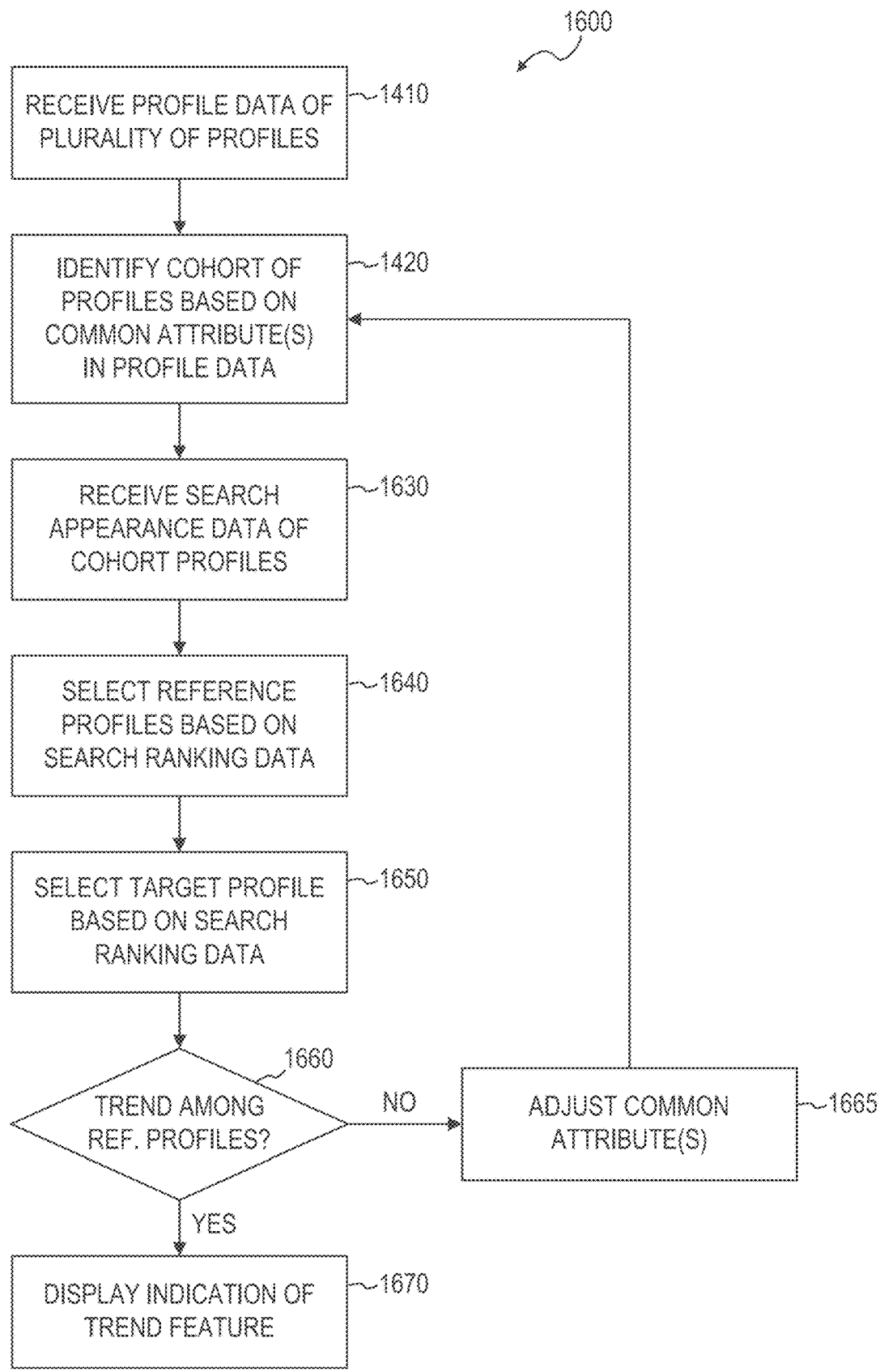
FIG. 16 is a flowchart illustrating another method of identifying a feature to be associated with a profile in order to improve search appearance data of the profile, in accordance with an example embodiment.

FIG. 16 is a flowchart illustrating another method 1600 of identifying a feature to be associated with a profile in order to improve search appearance data of the profile, in accordance with an example embodiment. Method 1600 can be performed by processing logic that can comprise hardware (e.g., circuitry, dedicated logic, programmable logic, microcode, etc.), software (e.g., instructions run on a processing device), or a combination thereof. In one implementation, the method 1600 is performed by the search discovery system 216 of FIGS. 2-3, or any combination of one or more of its modules, as described above.

At operation 1410, the search discovery system 216 receives corresponding profile data for each one of a plurality of profiles of users of a social networking service.

At operation 1420, the search discovery system 216 identifies a cohort of profiles from the plurality of profiles based on a determination that a set of one or more attributes is shared among the profile data of each one of the profiles of the cohort of profiles.

At operation 1630, the search discovery system 216 receives corresponding search ranking data for each one of the profiles of the cohort of profiles, with the corresponding search ranking data comprising an indication of a position of the corresponding profile within search results for each time the corresponding profile was included within search results during a time period.

At operation 1640, the search discovery system 216 selects a plurality of reference profiles from the cohort of profiles based on a determination that the corresponding search ranking data of the plurality of reference profiles each satisfy a first ranking criteria.

At operation 1650, the search discovery system 216 selects a target profile from the cohort of profiles based on a determination that the search ranking data of the target profile satisfies a second ranking criteria different from the first ranking criteria, with the target profile being distinct from the plurality of reference profiles.

At operation 1660, the search discovery system 216 analyzes one or more features of the reference profiles to determine whether or not a trend exists among the plurality of reference profiles. This determination is made based on a trend criteria. In some example embodiments, the trend criteria comprises a minimum threshold portion (e.g., minimum number, minimum percentage) of the plurality of reference profiles having the feature(s) and the target profile not having the feature(s) If, at operation 1660, the search discovery system 216 determines that the trend criteria is satisfied, then the search discovery system 216 identifies the trend of the feature(s), and proceeds to operation 1670, where the search discovery system 216 causes an indication of the feature(s) to be displayed on a computing device of the user of the target profile based on the identifying of the trend.

If, at operation 1660, the search discovery system 216 determines that the trend criteria is not satisfied (e.g., the minimum threshold portion of the plurality of reference profiles having the feature(s) is not met), then the search discovery system 216 proceeds to operation 1665, where the search discovery system 216 attempts to broaden the scope of the cohort to be used in the method 1600, adjusting the common attributes that the search discovery system 216 is attempting to find to be shared among the cohort of profiles. The search discovery system 216 then returns to operation 1420, where the search discovery system 216 identifies another cohort of profiles, different from the previously-identified cohort of profiles, based on a determination that a different set of one or more attributes is shared among the profile data of each one of the profiles of the other cohort of profiles. For example, during the first performance of operation 1420, the search discovery system 216 may have determined the first cohort of profiles based on a determination that each profile in the first cohort of profiles comprised profile data indicating a job industry of patent law and a job title of patent attorney. However, the search appearance data and/or the profile data for the first cohort may be determined by the search discovery system 216 to be insufficient or search discovery system 216 to identify a trend. In response to such a determination, the search discovery system 216 may adjust the criteria for identifying the cohort of profiles in order to obtain additional or different search appearance data and/or profile data sufficient to satisfy the trend criteria. For example, during the repeat performance of operation 1420, the search discovery system 216 may determine the second cohort of profiles based on a determination that each profile in the first cohort of profiles comprised profile data indicating a job industry of patent law, without the requirement that the profile data indicates a job title of patent attorney. Such use of an adjustment in the criteria for common attributes among the cohort of profiles acts as a useful remedy in handling situations in which the data being used to identify a trend is insufficient.

It is contemplated that any of the other features described within the present disclosure can be incorporated into method 1600.

Example Mobile Device

Figure 17:
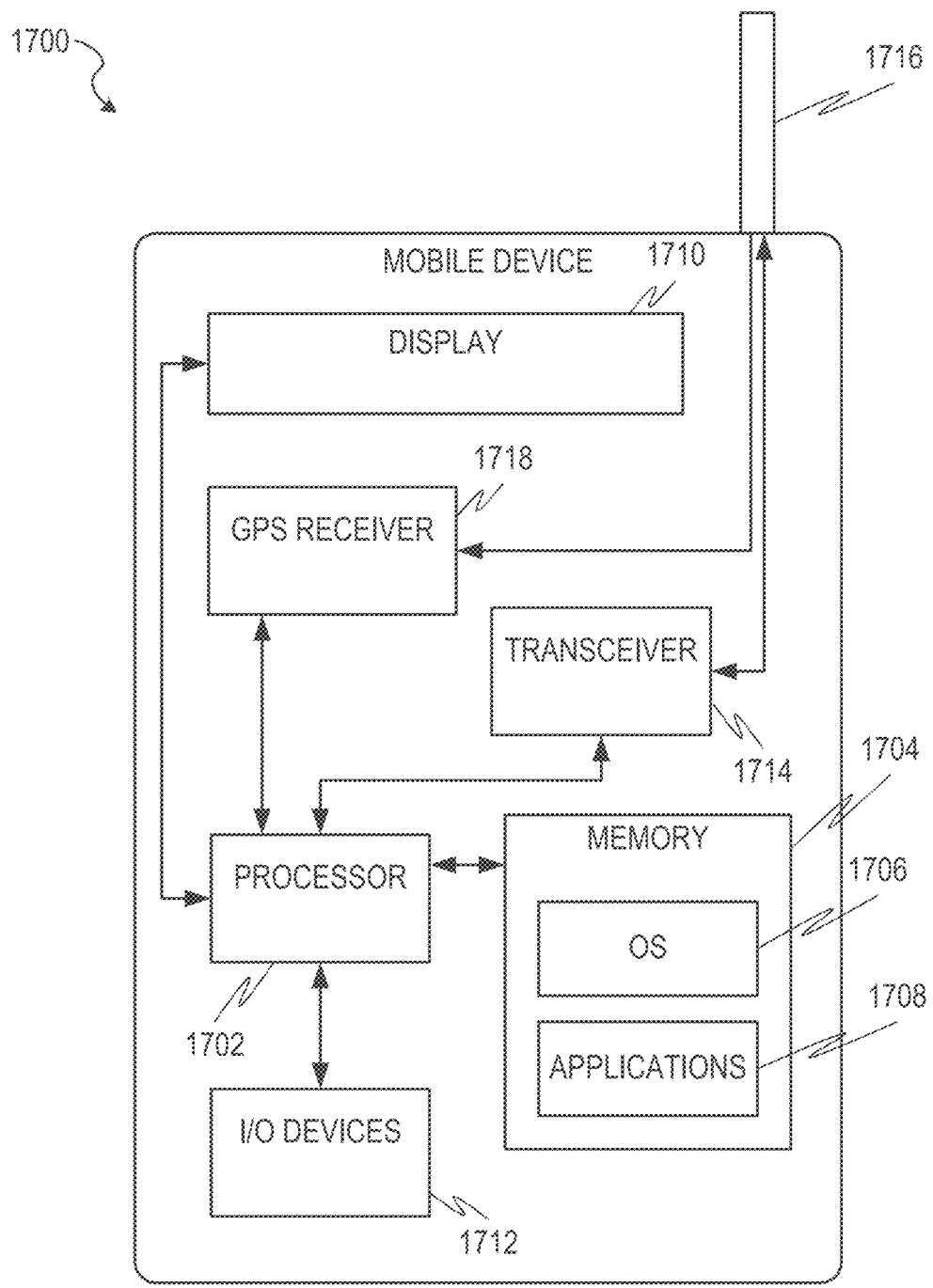
FIG. 17 is a block diagram illustrating a mobile device, in accordance with some example embodiments.

FIG. 17 is a block diagram illustrating a mobile device 1700, according to an example embodiment. The mobile device 1700 can include a processor 1702. The processor 1702 can be any of a variety of different types of commercially available processors suitable for mobile devices 1700 (for example, an XScale architecture microprocessor, a Microprocessor without Interlocked Pipeline Stages (MIPS) architecture processor, or another type of processor) A memory 1704, such as a random access memory (RAM), a Flash memory, or other type of memory, is typically accessible to the processor 1702. The memory 1704 can be adapted to store an operating system (OS) 1706, as well as application programs 1708, such as a mobile location-enabled application that can provide location-based services (LBSs) to a user. The processor 1702 can be coupled, either directly or via appropriate intermediary hardware, to a display 1710 and to one or more input/output (I/O) devices 1712, such as a keypad, a touch panel sensor, a microphone, and the like. Similarly, in some embodiments, the processor 1702 can be coupled to a transceiver 1714 that interfaces with an antenna 1716. The transceiver 1714 can be configured to both transmit and receive cellular network signals, wireless data signals, or other types of signals via the antenna 1716, depending on the nature of the mobile device 1700. Further, in some configurations, a GPS receiver 1718 can also make use of the antenna 1716 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 18:
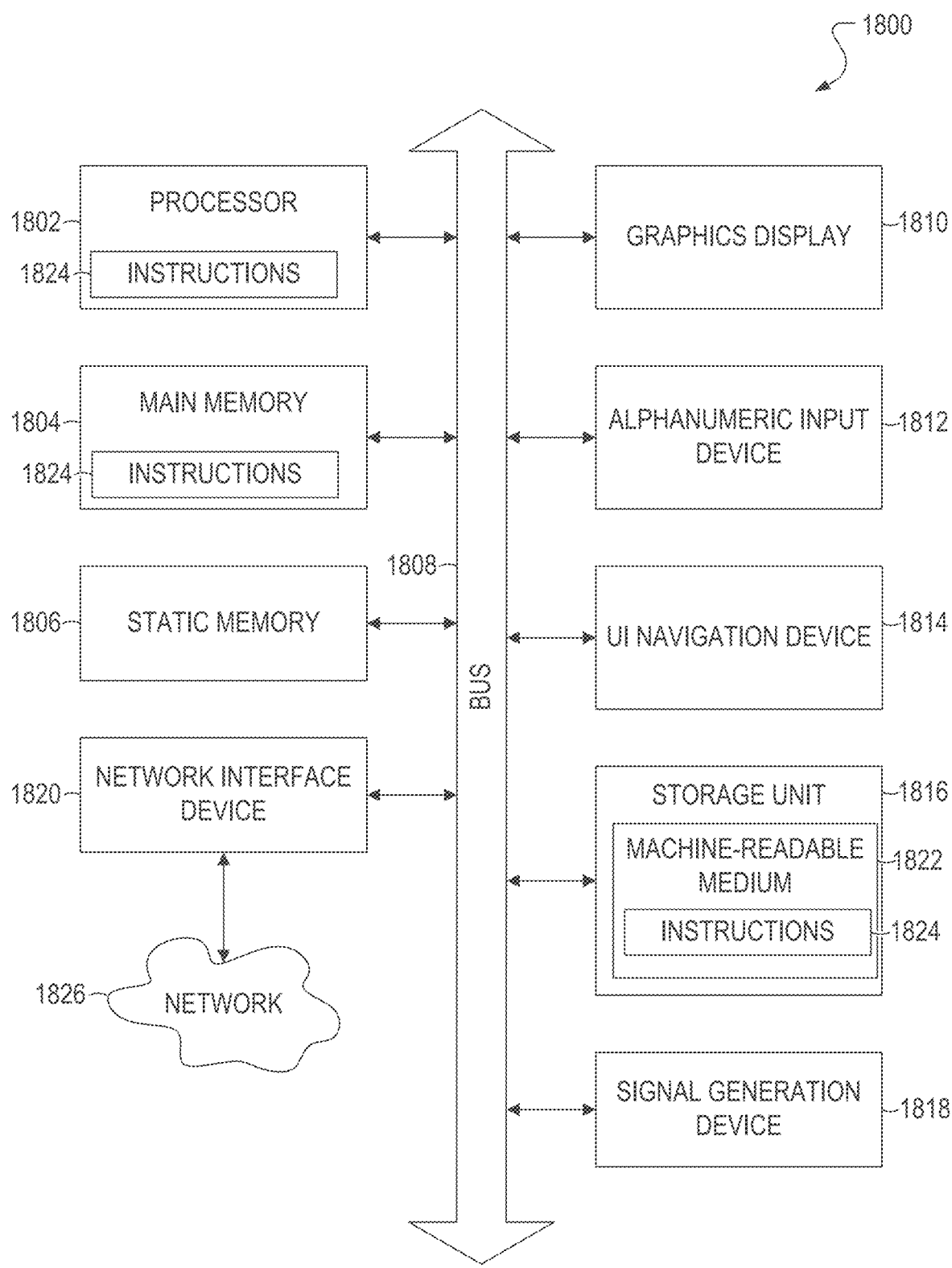
FIG. 18 is a block diagram of an example computer system on which methodologies described herein may be executed, in accordance with an example embodiment.

FIG. 18 is a block diagram of an example computer system 1800 on which methodologies described herein may be executed, in accordance with an example embodiment In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a graphics display unit 1810 (e.g., a liquid crystal display (LCD) or a cathode ray tube (CRT)). The computer system 1800 also includes an alphanumeric input device 1812 (e.g., a keyboard or a touch-sensitive display screen), a user interface (UI) navigation device 1814 (e.g., a mouse), a storage unit 1816, a signal generation device 1818 (e.g., a speaker) and a network interface device 1820.

Machine-Readable Medium

The storage unit 1816 includes a machine-readable medium 1822 on which is stored one or more sets of instructions and data structures (e.g., software) 1824 embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions (e.g., instructions 1824) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices, magnetic disks such as internal hard disks and removable disks; magneto-optical disks; and CD-ROM and DVD-ROM disks.

Transmission Medium

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
receiving, by a computer system having at least one hardware processor, corresponding profile data for each one of a plurality of profiles of users of a social networking service;
identifying, by the computer system, an initial cohort of profiles from the plurality of profiles based on a determination that a first attribute and a second attribute are shared among the profile data of each one of the profiles of the initial cohort of profiles;

receiving, by the computer system, corresponding search appearance data for each one of the profiles of the initial cohort of profiles, the corresponding search appearance data comprising an impression count indicating a number of times the profile of the initial cohort of profiles has been included in search results during a time period;

selecting, by the computer system, an initial plurality of reference profiles from the initial cohort of profiles based on a determination that the corresponding impression counts of the initial plurality of reference profiles each satisfy a first impression criteria;

determining, by the computer system, that a first trend criteria is not satisfied by the initial plurality of reference profiles;

identifying, by the computer system, a first cohort of profiles from the plurality of profiles based on a determination that at least one attribute is shared among the profile data of each one of the profiles of the first cohort of profiles, the identifying the first cohort of profiles from the plurality of profiles is performed based on the determination that the first trend criteria is not satisfied by the initial plurality of reference profiles, the at least one attribute upon which the identifying of the first cohort of profiles is based comprising the first attribute and not including the second attribute;

receiving, by the computer system, corresponding search appearance data for each one of the profiles of the first cohort of profiles, the corresponding search appearance data comprising an impression count indicating a number of times the profile has been included in search results during a time period;

selecting, by the computer system, a first plurality of reference profiles from the first cohort of profiles based on a determination that the corresponding impression counts of the first plurality of reference profiles each satisfy the first impression criteria;

selecting, by the computer system, a first target profile from the first cohort of profiles based on a determination that the impression count of the first target profile satisfies a second impression criteria different from the first impression criteria, the first target profile being distinct from the first plurality of reference profiles;

identifying, by the computer system, a first trend among the first plurality of reference profiles based on the first trend criteria, the first trend corresponding to at least one feature that is determined to not be associated with the first target profile; and causing, by the computer system, an indication of the at least one feature to be displayed on a computing device of the user of the first target profile based on the identifying of the first trend.

2. The computer-implemented method of claim 1, wherein the selecting the first plurality of reference profiles comprises:

ranking the profiles in the first cohort of profiles based on their corresponding impression counts; and selecting the first plurality of reference profiles based on the their ranking, the first impression criteria comprising the ranking of the first plurality of reference profiles indicating that their corresponding impression counts are within a highest portion amongst the impression counts of the profiles in the first cohort of profiles.

3. The computer-implemented method of claim 2, wherein the selecting the first target profile comprises selecting the first target profile based on its ranking, the second impression criteria comprising the ranking of the first target profile indicating that its impression count is within a lowest portion amongst the impression counts of the profiles in the first cohort of profiles.

4. The computer-implemented method of claim 1, wherein the at least one attribute comprises at least one of an industry, a job title, a company, and a location.

5. The computer-implemented method of claim 1, wherein the at least one feature comprises at least one profile section for which data is stored, and the trend criteria comprises a minimum threshold portion of the first plurality of reference profiles having data stored in association with the at least one profile section.

6. The computer-implemented method of claim 1, wherein the at least one feature comprises at least one keyword, and the trend criteria comprises a minimum threshold portion of the first plurality of reference profiles having the at least one keyword stored as profile data.

7. The computer-implemented method of claim 1, wherein the at least one feature comprises at least one content, and the trend criteria comprises a minimum threshold portion of the first plurality of reference profiles having posted the at least one content.

8. The computer-implemented method of claim 1, wherein the at least one feature comprises at least one profile to which the target profile is not connected, and the trend criteria comprises a minimum threshold portion of the first plurality of reference profiles being connected to the at least one profile.

9. The computer-implemented method of claim 8, wherein the indication of the at least one feature comprises a recommendation to connect with the at least one profile.

10. The computer-implemented method of claim 9, wherein a position of the at least one profile within a list of profiles included in the recommendation is determined based on the identifying of the first trend.

11. The computer-implemented method of claim 1, wherein the at least one feature comprises at least one group to which the first target profile has not joined, and the trend criteria comprises a minimum threshold portion of the first plurality of reference profiles having joined the at least one group.

12. The computer-implemented method of claim 1, wherein the search appearance data further comprises corresponding search ranking data for each one of the profiles of the first cohort of profiles, the search ranking data comprising an indication of a position of the corresponding profile within search results for each time the corresponding profile was included within search results during the time period, and the method further comprises:

selecting, by the computer system, a second plurality of reference profiles from the first cohort of profiles based on a determination that the corresponding search ranking data of the second plurality of reference profiles each satisfy a first ranking criteria;

selecting, by the computer system, a second target profile from the first cohort of profiles based on a determination that the search ranking data of the second target profile satisfies a second ranking criteria different from the first ranking criteria, the second target profile being distinct from the second plurality of reference profiles;

identifying, by the computer system, a second trend among the second plurality of reference profiles based on a second trend criteria, the second trend corresponding to one or more features that are determined to not be associated with the second target profile; and causing, by the computer system, an indication of the one or more features to be displayed on a computing device of the user of the second target profile based on the identifying of the second trend.

13. A system comprising:

at least one hardware processor; and a non-transitory machine-readable medium embodying a set of instructions that, when executed by the at least one hardware processor, cause the at least one processor to perform operations, the operations comprising:

receiving corresponding profile data for each one of a plurality of profiles of users of a social networking service;

identifying an initial cohort of profiles from the plurality of profiles based on a determination that a first attribute and a second attribute are shared among the profile data of each one of the profiles of the initial cohort of profiles;

receiving corresponding search appearance data for each one of the profiles of the initial cohort of profiles, the corresponding search appearance data comprising an impression count indicating a number of times the profile of the initial cohort of profiles has been included in search results during a time period;

selecting an initial plurality of reference profiles from the initial cohort of profiles based on a determination that the corresponding impression counts of the initial plurality of reference profiles each satisfy a first impression criteria;

determining that a first trend criteria is not satisfied by the initial plurality of reference profiles;

identifying a first cohort of profiles from the plurality of profiles based on a determination that at least one attribute is shared among the profile data of each one of the profiles of the first cohort of profiles, the identifying the first cohort of profiles from the plurality of profiles is performed based on the determination that the first trend criteria is not satisfied by the initial plurality of reference profiles, the at least one attribute upon which the identifying of the first cohort of profiles is based comprising the first attribute and not including the second attribute;

receiving corresponding search appearance data for each one of the profiles of the first cohort of profiles, the corresponding search appearance data comprising an impression count indicating a number of times the profile has been included in search results during a time period;

selecting a first plurality of reference profiles from the first cohort of profiles based on a determination that the corresponding impression counts of the first plurality of reference profiles each satisfy the first impression criteria;

selecting a first target profile from the first cohort of profiles based on a determination that the impression count of the first target profile satisfies a second impression criteria different from the first impression criteria, the first target profile being distinct from the first plurality of reference profiles;

identifying a first trend among the first plurality of reference profiles based on the first trend criteria, the first trend corresponding to at least one feature that is determined to not be associated with the first target profile; and causing an indication of the at least one feature to be displayed on a computing device of the user of the first target profile based on the identifying of the first trend.

14. The system of claim 13, wherein the selecting the first plurality of reference profiles comprises:

ranking the profiles in the first cohort of profiles based on their corresponding impression counts; and selecting the first plurality of reference profiles based on the their ranking, the first impression criteria comprising the ranking of the first plurality of reference profiles indicating that their corresponding impression counts are within a highest portion amongst the impression counts of the profiles in the first cohort of profiles.

15. The system of claim 14, wherein the selecting the first target profile comprises selecting the first target profile based on its ranking, the second impression criteria comprising the ranking of the first target profile indicating that its impression count is within a lowest portion amongst the impression counts of the profiles in the first cohort of profiles.

16. The system of claim 13, wherein the at least one attribute comprises at least one of an industry, a job title, a company, and a location.

17. The system of claim 13, wherein the search appearance data further comprises corresponding search ranking data for each one of the profiles of the first cohort of profiles, the search ranking data comprising an indication of a position of the corresponding profile within search results for each time the corresponding profile was included within search results during the time period, and the operations further comprise:

selecting a second plurality of reference profiles from the first cohort of profiles based on a determination that the corresponding search ranking data of the second plurality of reference profiles each satisfy a first ranking criteria;

selecting a second target profile from the first cohort of profiles based on a determination that the search ranking data of the second target profile satisfies a second ranking criteria different from the first ranking criteria, the second target profile being distinct from the second plurality of reference profiles;

identifying a second trend among the second plurality of reference profiles based on a second trend criteria, the second trend corresponding to one or more features that are determined to not be associated with the second target profile; and causing an indication of the one or more features to be displayed on a computing device of the user of the second target profile based on the identifying of the second trend.

18. A non-transitory machine-readable medium embodying a set of instructions that, when executed by at least one hardware processor, cause the processor to perform operations, the operations comprising:

receiving corresponding profile data for each one of a plurality of profiles of users of a social networking service;

identifying an initial cohort of profiles from the plurality of profiles based on a determination that a first attribute and a second attribute are shared among the profile data of each one of the profiles of the initial cohort of profiles;

receiving corresponding search appearance data for each one of the profiles of the initial cohort of profiles, the corresponding search appearance data comprising an impression count indicating a number of times the profile of the initial cohort of profiles has been included in search results during a time period;

selecting an initial plurality of reference profiles from the initial cohort of profiles based on a determination that the corresponding impression counts of the initial plurality of reference profiles each satisfy a first impression criteria;

determining that a first trend criteria is not satisfied by the initial plurality of reference profiles;

identifying a first cohort of profiles from the plurality of profiles based on a determination that at least one attribute is shared among the profile data of each one of the profiles of the first cohort of profiles, the identifying the first cohort of profiles from the plurality of profiles is performed based on the determination that the first trend criteria is not satisfied by the initial plurality of reference profiles, the at least one attribute upon which the identifying of the first cohort of profiles is based comprising the first attribute and not including the second attribute;

receiving corresponding search appearance data for each one of the profiles of the first cohort of profiles, the corresponding search appearance data comprising an impression count indicating a number of times the profile has been included in search results during a time period;

selecting a first plurality of reference profiles from the first cohort of profiles based on a determination that the corresponding impression counts of the first plurality of reference profiles each satisfy the first impression criteria;

selecting a first target profile from the first cohort of profiles based on a determination that the impression count of the first target profile satisfies a second impression criteria different from the first impression criteria, the first target profile being distinct from the first plurality of reference profiles;

identifying a first trend among the first plurality of reference profiles based on the first trend criteria, the first trend corresponding to at least one feature that is determined to not be associated with the first target profile; and causing an indication of the at least one feature to be displayed on a computing device of the user of the first target profile based on the identifying of the first trend.

* * * * *